US006180219B1

(12) United States Patent
Hoshino et al.

(10) Patent No.: US 6,180,219 B1
(45) **Date of Patent: *Jan. 30, 2001**

(54) INK JET RECORDING MATERIAL AND METHOD OF PRODUCING THE SAME

(75) Inventors: Mitsuhide Hoshino; Hisahiro Omote; Akio Hoshino, all of Saitama-Ken; Tomonobu Ohmura, Tokyo; Masahide Takano, Saitama-Ken, all of (JP)

(73) Assignee: Nippon Paper Industries Co., Ltd. (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/998,556

(22) Filed: Dec. 24, 1997

(30) Foreign Application Priority Data

Dec. 27, 1996 (JP) .................................................. 8-357814
Dec. 19, 1997 (JP) .................................................. 9-365116

(51) Int. Cl.[7] .............................. B32B 5/00; B32B 31/04

(52) U.S. Cl. .................................... 428/312.2; 428/307.3; 428/312.6; 428/312.8; 428/317.1; 428/325; 428/331; 428/332; 428/336; 428/537.5; 156/230; 156/241

(58) Field of Search ............................. 428/304.4, 307.3, 428/312.2, 312.6, 312.8, 316.6, 317.1, 317.5, 325, 331, 332, 532, 537.5, 336; 156/230, 241

(56) References Cited

U.S. PATENT DOCUMENTS 4,460,637 * 7/1984 Miyamoto et al. .................. 428/212

FOREIGN PATENT DOCUMENTS 0648611 4/1995 (EP) .
0705710 4/1996 (EP) .
0803374 10/1997 (EP) .
2295973 6/1996 (GB) .

OTHER PUBLICATIONS

Patent Abstracts of Japan, vol. 097, No. 003, (Mar. 31, 1997)/Mitsubishi Paper Mills, Ltd., (JP 08300806).

* cited by examiner

*Primary Examiner*—Marie Yamnitzky
(74) *Attorney, Agent, or Firm*—Millen, White, Zelano, & Branigan, P.C.

(57) ABSTRACT

An ink jet recording material produced by preparing a material (i) for transfer use, which has on a support having a high surface smoothness an ink receiving layer comprising a porous inorganic composition and a resin component; preparing another material (ii) to undergo transfer, which has at least one ink receiving layer coated on at least one side of a substrate; bonding the ink receiving layer of the material (i) to the ink receiving layer of the material (ii) in tight contact to form a united ink receiving layer; and then peeling the support of the material (i) off the united ink receiving layer to reproduce the surface shape of the support at the surface of the united ink receiving layer; wherein the united ink receiving layer has a total thickness of at least 20 μm and a gloss of at least 60% when measured at the incident angle of 60° according to JIS Z8741: and a method of producing the aforesaid ink jet recording material.

19 Claims, 1 Drawing Sheet

INK JET RECORDING MATERIAL AND METHOD OF PRODUCING THE SAME

FIELD OF THE INVENTION

The present invention relates to an ink jet recording material which can provide recorded images of high quality and, more particularly, to an ink jet recording material which not only bears characteristics basically required for a recording material, such as high ink absorbency, vivid ink coloration and excellent keeping properties, but also has a high gloss and causes only a slight decrease in gloss by recording; and further to a method of producing an ink jet recording material having the aforesaid properties.

BACKGROUND OF THE INVENTION

In an ink jet recording method, fine ink drops ejected by a wide variety of mechanisms are made to adhere to a recording material, such as paper, thereby recording pictures and letters thereon. Since the ink jet recording method is a noiseless and high-speed recording method, enables easy formation of full color images and requires no developing and fixing operations, the range of its use has shown a rapid rate of increase. Further, a multicolor ink jet recording method enables the formation of color images which can stand comparison with multicolor prints obtained by a plate-making process or color photography, and that at a lower price than color photography so far as there is no need of making a number of copies. Thus, the ink jet recording method is being widely utilized in the field of full-color image recording also.

Much effort to utilize woodfree paper and coated paper, which are generally used in graphic arts or as writing paper, as the recording paper for ink jet recording have been made from the apparatus and ink composition sides. As a result thereof, ink jet recording apparatus has undergone various improvements in performances, and thereby high-speed, high definition or/and full-color recording has been realized and the range of its use is being increased. However, such advances in the recording apparatus have come to require higher levels of characteristics for the recording paper side.

More specifically, the ink jet recording paper is required to have properties of (i) ensuring a high dot density and a bright-and-vivid tone (excellent coloring) in the ink dot images recorded thereon, (ii) enabling high-speed drying of ink to cause neither running nor bleeding of the ink even when ink dots are overlapped, and (iii) enabling a moderate diffusion of ink dots in the horizontal direction to ensure a smooth and clear circumference in the ink dots adhering thereto. Further, it is required as an important factor in forming images of high quality that the recording material causes only a slight decrease in gloss by recording.

A cause of decrease in gloss by recording is as follows: The ink-receiving layer of a recording material absorbs ink upon ink jet recording, and the resin and the pigment contained therein are dissolved in the ink or get swollen as they absorb the ink, thereby destroying the surface of the recording material.

It has so far been required for an ink jet recording paper to meet two essential conditions that the recording material should ensure (1) excellent image quality and (2) no decrease in gloss due to ink jet recording. For the purpose of obtaining a substitute for color photographic paper or conferring a high-grade feeling on the printed (recorded) images, a new requirement that the gloss itself which the ink jet recording paper has after recording should be higher than usual has recently been added to the aforementioned ones.

With the intention of solving those problems, some proposals as described briefly below have hitherto been made.

For instance, as means for providing excellent image quality, there has been disclosed the ink jet recording paper prepared by applying a coating color for surface conversion to a low sized raw paper (Japanese Tokkai Sho 52-53012, wherein the term “Tokkai” as used herein means an “unexamined published patent application”) and the ink jet recording paper prepared by impregnating a sheet containing therein urea-formaldehyde resin particles with a water-soluble high polymer (Japanese Tokkai sho 53-49113). These ink jet recording papers of general paper type can absorb ink quickly, but it has disadvantage in that the circumferences of ink dots put thereon are liable to be blurred and the density thereof becomes low.

In addition, the ink jet recording paper having an ink absorbing layer coated on the support surface is disclosed in Japanese Tokkai Sho 55-5830, and the case wherein the pigment used in the layer coated on the support surface is a silica powder is disclosed in Japanese Tokkai Sho 55-51581. These ink jet recording papers of coated paper type have improvements in the diameter, the shape and the density of ink dots and the reproduction of color tone over ink jet recording papers of general paper type.

The ink applied to those recording papers is generally water-base ink using water-soluble dyes. Therefore, when the images formed on the recording papers are exposed to water or the like, the dyes are dissolved again to ooze out to the paper surface; as a result, the value as a recorded matter is markedly lowered. In other words, such recording papers have a problem of being poor in water resistance.

On the other hand, the case where the ink receiving layer contains a large amount of water-soluble resin has a defect that the swelling or the dissolution of the resin occurs upon contact with ink to lower the gloss in the printed area (the area which is in contact with ink).

For the purpose of mitigating those drawbacks, the improvement in water resistance or the like by the incorporation of porous cationic hydrated aluminum oxide has been proposed in Japanese Tokko Hei 3-24906 (Registration No. 1735506), wherein the term “Tokko” as used herein means an “examined patent publication”. In this proposal, attention is focused on the porosity of hydrated aluminum oxide. More specifically, liquid substances, such as ink and water, can get into pores of the hydrated aluminum oxide; as a result, it becomes very difficult for ink to cause the swelling or the dissolution of the ink receiving layer. Thus, the decrease in gloss due to recording can be reduced.

Although this proposal enables an ink jet recording paper to fulfil two requirements, namely (i) excellent image quality and (ii) no decrease in gloss by ink jet recording, it is still unsuccessful in ensuring sufficient gloss in the ink jet recording paper after recording.

As means to prepare an ink jet recording paper having high gloss enough to ensure sufficient gloss after recording, there are known (1) a method in which paper is passed between heat- and pressure-applied roll nips, such as a method of using a super calender, and (2) a method in which an ink receiving layer in a wet state is brought into contact with a heated specular surface under pressure and then dried (which is referred to as a “cast coating method” in the arts of preparing coated papers), as disclosed in Japanese Tokkai Hei 6-79967.

However, the application of the former method to the ink jet recording paper having an ink receiving layer formed by directly coating a support with a porous inorganic composition as described in Japanese Tokko Hei 3-24906 (e.g., alumina and silica) enables the recording paper to have a highly glossy surface, but causes the collapse of pores formed by the use of the porous inorganic composition to render the coated layer itself hard. Thus, the ink absorbency is lowered to fail in achieving excellent image quality.

In the application of the latter method (cast coating method), on the other hand, the coating color provided on a support to form an ink receiving layer has many restrictions as to viscosity, solid concentration and so on because of the properties of an inorganic composition used therein, such as alumina sol, and it is difficult to thicken the ink receiving layer by increasing the coverage rate. This is because when the concentration of an inorganic composition, such as alumina sol, is heightened the coating color has an excessively increased viscosity to result in a lack of coating suitability. In other words, only an ink receiving layer having small thickness can be formed in this case. Therefore, sufficient ink absorbency cannot be achieved and the images of good quality cannot be formed.

Under these circumstances, the Inventors continued researches into new methods, other than super calendering and cast coating methods, for producing an ink jet recording paper which not only causes no decrease in gloss upon recording but also ensures excellent image quality and high gloss after recording and, as disclosed in Japanese Tokkai Hei 8-164668, developed a transferring technique for producing an ink jet recording paper having a high surface gloss. However, this transferring technique is still unsatisfactory. This is because the transferring technique cited above has a disadvantage in that, since the ink receiving layer provided on the support of a transfer material is transferred and bonded directly to a base paper used as the substrate of an ink jet recording paper to be produced, the texture and the whiteness of the base paper are apt to be reflected in the surface of the ink jet recording paper as the final product and, in other words, the surface properties of the final product are susceptible to the properties of a base paper used as the substrate onto which an ink receiving layer is transferred. Further, the ink receiving layer comprising a porous inorganic composition is required to have a thickness of the order of 30 microns for acquiring the desired ink absorbency. However, the coating color for forming such a thick layer comes expensive on account of a high price of the inorganic composition and further, it is difficult to control the coating color upon storage so as to retain a high concentration enough to form such a thick layer. In addition, the transferring technique cited above is inferior in production efficiency since it takes too much time to dry the layer containing a porous inorganic composition in high proportion.

SUMMARY OF THE INVENTION

Therefore, an object of the present invention is to provide an ink jet recording material which not only ensures excellent quality in the images recorded thereon, but also has a high gloss and causes only a slight decrease in gloss by undergoing ink jet recording to retain a high gloss after recording also, thereby being usable as a satisfactory substitute for a photographic paper used in color photography, or capable of giving a high-grade feeling to the images printed (recorded) thereon.

Another object of the present invention is to provide a method of producing an ink jet recording material which has all the characteristics mentioned above.

The above-described objects are attained by an ink jet recording material produced by preparing a material (i) for transfer use which has a support coated with an ink receiving layer comprising a porous inorganic composition and a resin component (hereinafter referred to as "first ink receiving layer") and another material (ii) to undergo transfer which has at least one ink receiving layer (hereinafter referred to as "second ink receiving layer") coated on at least one side of a substrate, bonding the first ink receiving layer to the second ink receiving layer in tight contact to form a united ink receiving layer, and then peeling the support of the material (i) off the united ink receiving layer; wherein the united ink receiving layer has a total thickness of at least 20 $\mu$m and a gloss of at least 60% when measured at the incident angle of 60° according to JIS Z8741: and a method of producing an ink jet recording material, which comprises preparing a material (i) for transfer use which has a support coated with a first ink receiving layer comprising a porous inorganic composition and a resin component, preparing another material (ii) to undergo transfer which has at least one second ink receiving layer coated on at least one side of a substrate, bonding the first ink receiving layer to the second ink receiving layer in tight contact to unite them in an ink receiving layer, and then peeling the support of the material (i) off to transfer the first ink receiving layer to the material (ii), thereby reproducing the surface shape of the support at the surface of the united ink receiving layer.

DETAILED DESCRIPTION OF THE INVENTION

Figure 1:
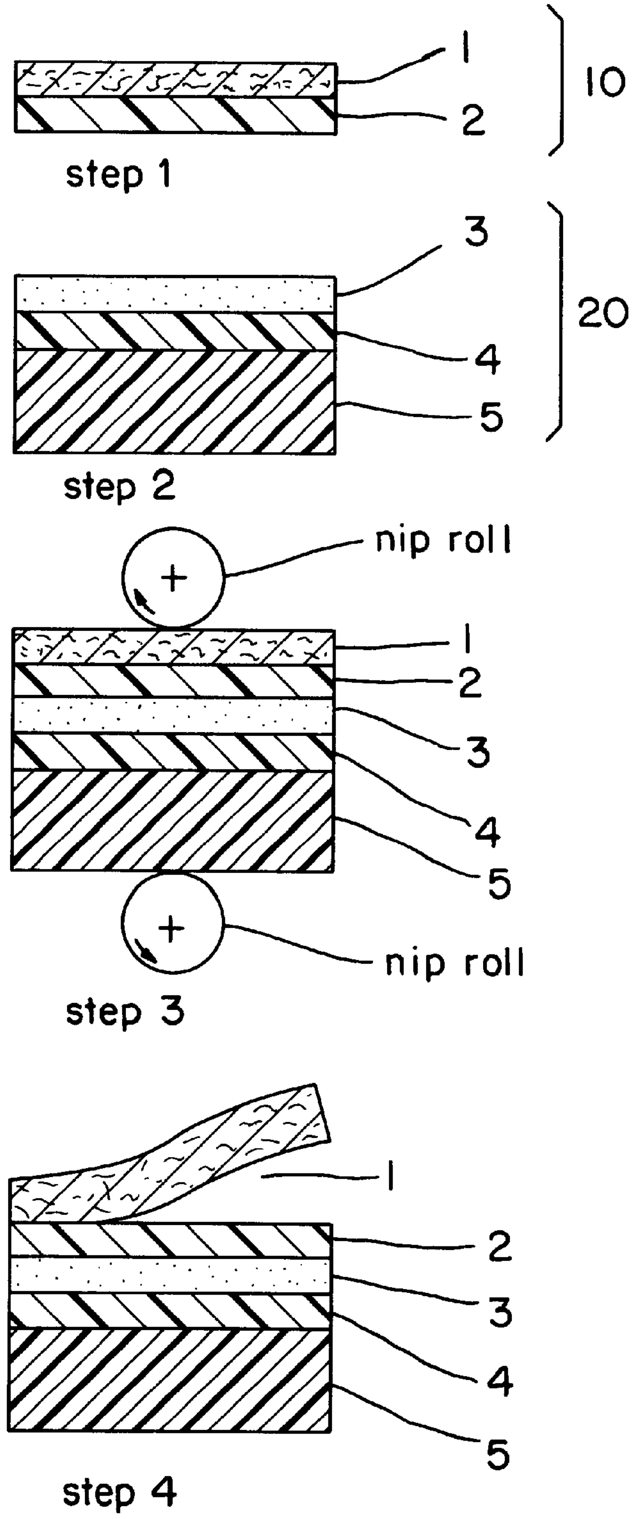
In FIG. 1, an embodiment of the present invention is schematically illustrated with cross sectional views. Therein, the numeral 1 denotes a support of a material for transfer use, the numeral 2 a first ink receiving layer, the numeral 3 a bonding layer, the numeral 4 a second ink receiving layer, the numeral 5 a substrate of a material to undergo transfer, the numeral 10 a material for transfer use, and the numeral 20 a material to undergo transfer.

The present invention is described in detail below by reference to the drawings.

FIG. 1 shows schematically an example of methods for producing ink jet recording material in accordance with the present invention.

The numeral 10 in FIG. 1 denotes a material for transfer use, which has a support 1 provided with a first ink receiving layer 2 comprising a porous inorganic composition and a resin component; and the numeral 20 denotes a material to undergo transfer, which has at least one ink receiving layer 4 (referred to as the second ink receiving layer) coated on at least one side of a substrate 5 as the final support of an ink jet recording material to be produced, and which is further provided with a bonding layer 3 as its surface layer so that the first ink receiving layer 2 is bonded to the second ink receiving layer 4 in tight contact.

The support 1 of a material for transfer use is not a constituent of the final product, but it is an intermediate substance as seen from FIG. 1. However, the support 1 forms an important element in the present invention, because it is not only used for the transfer of the first ink receiving layer 2 but also decisive of the surface gloss of the ink receiving layer 2. Accordingly, it is required for the support 1 to have a high smoothness and a high gloss at the surface as well as an ability to release the first ink receiving layer 2. Specifically, it is desirable for the support 1 to have a surface smoothness high enough to confer a gloss of at least 60% (when measured at the incident angle of 60° according to JIS Z8741) on the surface of the ink receiving layer to constitute the final product. As far as it fills these requirements, the support 1 has no other particular restrictions.

Examples of a substance which can be used as the support 1 include various plastic films (such as polyethylene, polypropylene and polyethylene terephthalate films), sheets prepared by pasting papers up with resin films, and the so-called laminated papers prepared by treating papers with molten resins. In addition, release paper treated with a melamine resin, silicone resin or the like, which is a variety of converted paper, can also be used.

The porous inorganic composition (hereinafter referred to as "the pigment" also) comprised in the first ink receiving layer 2 may be any inorganic substance so far as it has high ink absorbency. As an example of such a substance, a porous xerogel can be used, which is prepared, e.g., by converting an inorganic metal oxide in a sol state (such as silica sol, alumina sol, zirconia sol or titania sol) into a hydrogel, drying the hydrogel in the form of film, and then grinding it into a powder.

The resin component comprised in the first ink receiving layer 2 may be any of resins as far as they can be blended with the foregoing inorganic composition and form a film by coating and drying on a support substance as recited above. For the purpose of securing high ink absorbency, however, it is desirable to use a water-soluble resin or/and a water-dispersible resin.

The suitable ratio of the pigment to the resin(s) in the first ink receiving layer is from 97/3 to 70/30 by weight. When the pigment/resin(s) ratio is increased beyond 97/3 by weight, the coating obtained is brittle, so that it tends to be transferred in a poor condition. When the pigment/resin(s) ratio is below 70/30 by weight, the ink absorbency is lowered. In particular, it is advantageous to the first ink receiving layer to have the pigment/resin(s) ratio in the range of 93/7 to 85/15 by weight.

Of resins usable in the first ink receiving layer, water-soluble cellulose is preferable to other resins because it has the property of gelling at a high temperature. More specifically, when water-soluble cellulose is present in the coating mixture, the coated layer in a wet state gels upon exposure to hot air for drying to lose the fluidity (or to become a semisolid), and thereby the coated layer can be dried as it retains the thickness in the wet state. When a general resin is used in the coating mixture, on the other hand, the solvent in the coated layer evaporates during drying with hot air and the coated layer retains a fluidity before it solidifies; as a result, the thickness of the coated layer becomes smaller after drying than before drying.

Accordingly, the use of water-soluble cellulose in the first ink receiving layer can lower a pigment density in the coated layer to render the first ink receiving layer more porous, and thereby the first ink receiving layer can have improved ink absorbency.

In the first ink receiving layer, however, it is desirable that the water-soluble cellulose be used in a proportion of 1 to 50 weight % to the total resins used. When the water-soluble cellulose is mixed with other resins in a proportion less than 1 weight %, no appreciable improvement in ink absorbency is produced; while, when the proportion exceeds 50 weight %, the coating mixture has a sharp increase in viscosity to undergo deterioration in coating suitability, and the ink receiving layer formed therewith suffers from a beading phenomenon, namely ink drops ejected from a printer are absorbed by the layer without spreading thereon to take the form of irregularly linked beads. Preferably, the water-soluble cellulose is used in combination with other resins, and it can produce greater effect when it is used in a proportion of 5 to 15 weight % to the total resins.

Further, various additives, such as a pigment dispersing agent, a thickener, a leveling agent, an anti-foaming agent, a foam inhibitor, a brightening agent, a coloring dye and a coloring pigment, can optionally be mixed with the foregoing inorganic composition in the first ink receiving layer 2.

The substrate 5 may be any substance so far as it has a strength enough for the final support of an ink jet recording material. Besides paper, examples of a substance which can be used as the substrate 5 include various plastic films (such as polyethylene, polypropylene and polyethylene terephthalate films), sheets prepared by pasting papers up with resin films and the so-called laminated papers prepared by treating papers with molten resins. In particular, paper is used to advantage when a wet lamination method is adopted.

Examples of paper usable as the substrate 5 include various kinds of raw paper prepared by using various types of pulp, including chemical pulp (such as LBKP or NBKP), mechanical pulp (such as GP, PGW, TMP or CMP) and waste paper pulp (such as DIP), and pigments as main components, mixing them with a binder, a sizing agent, a fixing agent, a paper-strength reinforcing agent and so on, and forming the resultant mixtures into paper in accordance with various paper-making methods, and converted papers obtained by subjecting raw papers as recited above to treatments well-known in the papermaking field (e.g., size press and other coating treatments or a super calendering treatment), such as coat paper, art paper and cast-coated paper.

In a material to undergo transfer, which is denoted as 20 in FIG. 1, the second ink receiving layer 4 coated on the substrate 5 has no particular restriction, provided that it is constituted so that the surface thereof is not influenced by the properties of the substrate 5. Specifically, the ink receiving layer 4 can comprise at least one binder selected from the conventional binders for the ink receiving layer of an ink jet recording material, for example, a water-soluble resin such as polyvinyl alcohol (PVA) or polyvinyl pyrrolidone (PVP), or an aqueous emulsion resin such as polystyrene, a styrene copolymer or an ethylene-vinyl acetate copolymer, and thereto can be added an inorganic pigment, such as silicon oxide, calcium carbonate, titanium oxide or aluminum oxide, or/and resin particles such as a resin pigment, which can have various particle sizes, if desired. In addition to these additives, other various additives such as a pigment dispersing agent, a thickener, a leveling agent, an anti-foaming agent or a foam inhibitor, a brightening agent, a coloring dye and a coloring pigment, can be mixed with the binder in the second ink receiving layer 4.

The substance to constitute a bonding layer 3 for bonding the ink receiving layer 2 to the ink receiving layer 4 in tight contact, though it is required for the selection thereof to take ink absorbency and ink permeability into consideration, can be selected from generally used adhesives, including pressure sensitive adhesives also. Examples of a constituent of such adhesives include various types of resins such as an acrylic resin, an ethylene-vinyl acetate (EVA) resin, a polyester resin, an epoxy resin and an urethane resin.

Further, the first ink receiving layer 2 and the second ink receiving layer 4 can be bonded in tight contact using a wet lamination method, wherein either of the two ink receiving layers is coated with an aqueous solution of polyvinyl alcohol (PVA), polyvinyl pyrollidone (PVP) or the like which is, though generally used in the ink receiving layer of an ink jet recording material, difficult to transfer by applying heat and pressure thereto under ordinary condition and, of course, has no tackiness in a dry film state, and then these two ink receiving layers are brought into face-to-face contact and dried.

In the aforementioned wet lamination method, it is also possible to use a coating mixture for the first ink receiving layer or the second ink receiving layer as a substitute for an adhesive in itself. In a special case where a porous inorganic composition, e.g., alumina sol, is used as the adhesive, the alumina layer as an ink receiving layer can fix (or hold) the dye component of the ink, while the ink receiving layer 4 can absorb the solvent component of the ink, such as water or an alcohol. Therefrom, the advantage of a reduction in thickness of the first ink receiving layer can be obtained. In this case, it is desirable for the dry thickness of the first ink receiving layer 2 to be at least 3 μm in consideration of its relation to a surface gloss which the ink receiving layer has after transfer. In addition, it is desirable for the acquisition of proper adhesiveness that the dry thickness of the bonding layer 3 be at least 3 μm.

For the acquirement of excellent recording quality, it is desirable that the ink receiving layers united by transfer have a total thickness of at least 20 μm.

Examples of a coating method which can be adopted in forming ink receiving layers and a bonding layer according to the present invention include conventional coating methods wherein a blade coater, an air knife coater, a roll coater, a curtain coater, a die coater, a bar coater, a gravure coater, a spray apparatus and so on are used. Additionally, the coated layers can be solidified by drying with hot air, infrared rays or the like.

As shown in FIG. 1, the present method comprises (the first step) preparing a material 10 for transfer use by applying a coating mixture containing a porous inorganic composition and a resin as main components to a support 1 and then drying the solution to form a first ink receiving layer 2, (the second step) preparing a material 20 to undergo transfer by forming a second ink receiving layer 4 on a separate support 5 and further forming on the layer 4 an bonding layer 3 which is not necessarily solidified by drying, (the third step) bringing the bonding layer 3 of the material 20 and the first ink receiving layer 2 of the material 10 into face-to-face contact with each other and passing them between rolls to which pressure alone or both pressure and heat are applied, thereby bonding the first ink receiving layer 2 to the second ink receiving layer 4 in tight contact, and (the fourth step) peeling the support 1 off the first ink receiving layer 2, thereby transferring the ink receiving layer 2 from the support 1 to the support 5 and reproducing the highly glossy surface of the support 1 on the surface of the ink receiving layer 2.

In accordance with the present method for production of an ink jet recording material, at least one ink receiving layer (the second ink receiving layer) is provided in advance on a substrate as the final support, and thereto is transferred another ink receiving layer (the first ink receiving layer, which comprises a porous inorganic composition). Therefore, in contrast to the conventional transferring technique, the ink receiving layer comprising a porous inorganic composition need not to be thickened; as a result, the concentration of the inorganic composition in the coating mixture can be lowered to reduce the production cost and make the coating mixture control easy. Further, the present method enables the ink jet recording material as the final product to have not only excellent properties of forming high-quality images and causing no decrease in gloss by recording, but also improved surface gloss and texture after recording, irrespective of properties of the substrate as the final support. In addition, since at least one ink receiving layer is provided on a substrate as the final product, the whiteness of the substrate does not directly affect the whiteness of the final product; as a result, materials which are somewhat low in whiteness can be used as the substrate to further reduce a production cost of the intended ink jet recording material.

The present invention will now be illustrated in more detail by reference to the following examples, but it should be understood that these examples are not to be construed as limiting the scope of the invention in any way. Unless otherwise noted, all "parts" and all "%" are by weight in the following examples and comparative examples.

Additionally, the determination of various physical properties in the following examples and comparative examples is carried out as follows:

The printer used is an ink jet printer, MJ-800 (commercial name, a printer made by Epson Corp.), and the 4 kinds of printing ink used, namely cyan (C) ink, magenta (M) ink, yellow (Y) ink and black (BK) ink, are genuine ink products specified by the maker.

The thickness of an ink receiving layer is determined according to JIS P8118 (by means of a micrometer), and the gloss is determined by measuring the surface gloss of an ink receiving layer with a glossimeter, GM-3D (commercial name, a product of Murakami Shikisai Kenkujo) according to JIS Z8741 (incident angle of light: 60°).

Further, the ink absorbency is evaluated by making a printed pattern wherein square areas measuring 30 mm×30 mm in size which are printed respectively in blue color with cyan ink and magenta ink and in red color with magenta ink and yellow ink are arranged alternately, and examining the extent of bleeding at the boundary between the blue area and the red area by visual observation. The evaluation criterion adopted herein is the following:

○ No cissing, no bleeding and no running of ink are observed at the boundary between blue and red areas, and so the ink jet recording material produced has a high-grade recording quality.

Δ Some extent of cissing, bleeding and running of ink are observed at the boundary, but the extent thereof are allowable to the recording quality required.

X Cissing, bleeding and running of ink are observed at the boundary to such extent as to damage the recording quality.

According to the above criterion, it is required for a high-grade ink jet recording material to be rated as at least Δ.

With respect to the dot diameter, one dot alone is printed with magenta ink on each of ink jet recording materials produced, and the diameter thereof is observed under a microscope. The extent of bleeding is also evaluated by a change in dot diameter due to difference in ink receiving layers formed therein.

EXAMPLES 1 TO 3

A 50 μm-thick polyethylene terephthalate film of general type (Tetron S-type, commercial name, produced by Teijin Limited) was used as the support 1 of a material 10 for transfer use (shown in FIG. 1).

A coating mixture for forming the first ink receiving layer to constitute the material 10 was prepared as follows: In order to precipitate alumina hydrogel, 3,130 parts of an aluminum sulfate solution having an $Al_2O_3$ content of 8% and 2,080 parts of a sodium aluminate solution having an $Al_2O_3$ content of 26% were poured simultaneously into water with stirring as the pH of the resultant mixture was kept at 7.0–7.5, and further an excess of sodium aluminate was added thereto so as to adjust the pH to 10.5. The precipitate thus formed was filtered off to obtain alumina hydrogel.

The alumina hydrogel obtained was rinsed with the water adjusted to pH 10.5, thereby removing the sodium salt and the sulfate. After rinsing, the alumina hydrogel was slurried by being redispersed into water, adjusted to pH 7–8, and then filtered to reduce the sodium content to 0.1% or below. Further, the alumina hydrogel having the thus reduced sodium content was reslurried in a concentration of 10%, and dried with a spray dryer under a condition that the inlet temperature was regulated so as to be 180° C. Thus, a xerogel having a reticular structure rich in vacant spaces was obtained as a porous inorganic composition.

A 20% aqueous dispersion containing 90 parts of the thus obtained xerogel and 10 parts of oxidized starch (MS 3800, commercial name, a product of Nippon Shokuhin Co., Ltd.) was used as a coating mixture for forming the first ink receiving layer 2 shown in FIG. 1. The coating mixture for the first ink receiving layer 2 was coated at a dry thickness of 7 $\mu$m in Examples 1 and 3 each, while it was coated at a dry thickness of 12 $\mu$m in Example 2, and then solidified by drying at 130° C. with a hot-air circulated dryer. The drying of the first ink receiving layer required 60 seconds in Examples 1 and 3 each and 75 seconds in Example 2.

As the substrate 5 in FIG. 1 was used a general woodfree paper available in the market, Excellent Form (having a basis weight of 127.9 g/m$^2$, made by Nippon Paper Industries Co., Ltd.). A coating mixture used for forming the second ink receiving layer 4 on the substrate 5 was prepared in the following manner:

A 10% solution of polyvinyl alcohol (PVA-117, commercial name, a product of Kuraray Co., Ltd.) in 90° C. hot water and a 30% aqueous dispersion of silica (Nipsil NS, commercial name, a product of Nippon Silica Kogyo Co., Ltd.) were mixed in a ratio of 10:90 on a solid basis to obtain a 25% coating mixture.

The coating mixture obtained was applied to the surface of the substrate 5 by means of a Mayer bar, and then solidified by drying with 130° C. hot air to form the second ink receiving layer 4. In Examples 1 and 2 each, the coating mixture was applied in such an amount as to have a dry thickness of 10 $\mu$m and it took 10 seconds to dry the coating mixture applied; while in Example 3 the coating mixture was applied so as to have a dry thickness of 20 $\mu$m and the time required for drying it was 13 seconds.

Further, the coating mixture used for forming the first ink receiving layer was coated on the second ink receiving layer so as to have a dry thickness of 3 $\mu$m, thereby forming a bonding layer 3. Thus, the material 20 to undergo transfer was obtained.

Before the bonding layer 3 of the material 20 got dried, it was brought into face-to-face contact with the first ink receiving layer 2 of the material 10, then passed between rolls while applying pressure and heat thereto, and further subjected to drying with 100° C. hot air, thereby bonding the first ink receiving layer to the second ink receiving layer in tight contact. Then, the support 1 alone was peeled off; as a result, the highly smooth surface shape of the support 1 was reproduced at the surface of the first ink receiving layer. The thus prepared ink jet recording papers each had on the substrate 5 an ink receiving layer with a high surface gloss.

EXAMPLES 4 TO 6

Ink jet recording papers were produced in the same manners as in Examples 1, 2 and 3 respectively, except that the coating mixture used for forming both first ink receiving layer and bonding layer was replaced by a 20% aqueous dispersion containing 90 parts of the xerogel and, as water-soluble resins, 0.5 part of water-soluble cellulose (Metolose SM 100, co mmercial name, a product of Shin-Etsu Chemical Co., Ltd.) and 9.5 parts of polyvinyl alcohol (PVA-117, co mmercial name, a product of Kuraray Co., Ltd.)

EXAMPLES 7 AND 8

Ink jet recording papers were produced in the same manner as in Example 6, except that the water-soluble cellulose content in the aqueous dispersion used for forming the first ink receiving layer and the bonding layer was changed to 0 in Example 7 and 6 parts in Example 8 and the polyvinyl alcohol content therein was changed to 10 parts in Example 7 and 4 parts in Example 8.

EXAMPLE 9

An ink jet recording paper were produced in the same manner as in Example 6, except that the xerogel content, the water-soluble cellulose content and the polyvinyl alcohol content in the aqueous dispersion used for forming the first ink receiving layer and the bonding layer were changed to 60 parts, 2 parts and 38 parts respectively.

Comparative Examples 1 and 2

The same coating mixture as used for forming the first ink receiving layer in each of Examples 4 to 6 was applied to a general woodfree paper available in the market, Excellent Form (having a basis weight of 127.9 g/m$^2$, made by Nippon Paper Industries Co., Ltd.), so as to have a dry thickness of 15 $\mu$m in Comparative Example 1 and a dry thickness of 20 $\mu$m in Comparative Example 2, and then dried by being pressed against a specular drum heated to about 100° C. (This process is referred to as a cast coating method in the field of papermaking). Thus, an ink jet recording paper was obtained in Comparative Example 1, but Comparative Example 2 failed in forming a uniformly coated layer.

Comparative Example 3

An ink jet recording paper was produced in the same manner as in Examples 4 to 6, except that the dry thickness of the aqueous dispersion coated as the first ink receiving layer was changed to 27 $\mu$m and the coating mixture used for forming the bonding layer was applied directly to the woodfree paper as the substrate 5 at a dry thickness of 3 $\mu$m (without providing the second ink receiving layer). However, it took too much time (about 200 seconds) to dry the ink receiving layer even at a high temperature of 130° C. On the other hand, the drying of the ink receiving layers provided in Examples 1 to 9 each required a much shorter time in total (about 70–85 seconds). Therefore, the formation of such a thick layer by the transferring technique was undesirable from the viewpoint of production cost and efficiency.

Comparative Example 4

An ink jet recording paper was produced by using as the substrate 5 a general woodfree paper available in the market, Excellent Form (having a basis weight of 127.9 g/m$^2$, made by Nippon Paper Industries Co., Ltd.), applying the same coating mixture as used for the second ink receiving layer in Examples 1 to 9 to the woodfree paper at a dry thickness of 30 μm by means of a Mayer bar, and then solidifying the applied solution by drying with hot air.

Comparative Example 5

An ink jet recording paper was produced by using as the substrate 5 a general woodfree paper available in the market, Excellent Form (having a basis weight of 127.9 g/m$^2$, made by Nippon Paper Industries Co., Ltd.), applying the same coating mixture as used for the second ink receiving layer in Examples 1 to 9 to the woodfree paper at a dry thickness of 30 μm by means of a Mayer bar, then solidifying the applied solution by drying with hot air, and further undergoing a super calendering treatment (linear pressure: 40 kg/cm). The thus formed ink receiving layer had a surface gloss of medium degree.

The ink jet recording papers produced in the aforementioned manners were each examined for various physical properties in accordance with the measurement methods described hereinbefore, and the evaluation results thereof are shown in Table 1-1 (Examples) and Table 1-2 (Comparative Examples).

TABLE 1-1

| | unit | Example 1 | Example 2 | Example 3 | Example 4 | Example 5 | Example 6 | Example 7 | Example 8 | Example 9 |
|---|---|---|---|---|---|---|---|---|---|---|
| Method for forming first ink receiving layer | | transfer method | transfer method | transfer method | transfer method | transfer method | transfer method | transfer method | transfer method | transfer method |
| Thickness of first ink receiving layer | μm | 7 | 12 | 7 | 7 | 12 | 7 | 7 | 7 | 7 |
| Thickness of bonding layer | μm | 3 | 3 | 3 | 3 | 3 | 3 | 3 | 3 | 3 |
| Thickness of second ink receiving layer | μm | 10 | 10 | 20 | 10 | 10 | 20 | 20 | 20 | 20 |
| Total thickness of ink receiving layers | μm | 20 | 25 | 30 | 20 | 25 | 30 | 30 | 30 | 30 |
| Proportions of ingredients in first ink receiving layer | | | | | | | | | | |
| Porous xerogel | wt % | 90 | 90 | 90 | 90 | 90 | 90 | 90 | 90 | 60 |
| Oxidized starch | wt % | 10 | 10 | 10 | — | — | — | — | — | — |
| Water-soluble cellulose | wt % | — | — | — | 0.5 | 0.5 | 0.5 | 0 | 6 | 2 |
| Polyvinyl alcohol | wt % | — | — | — | 9.5 | 9.5 | 9.5 | 10 | 4 | 38 |
| Ink absorbency | | ○ | ○ | ○ | ○ | ○ | ○ | Δ | Δ | X |
| Dot diameter | μm | 90 | 80 | 70 | 90 | 80 | 70 | 120 | 120 | 150 |
| Gloss | | | | | | | | | | |
| Before recording | % | 63 | 65 | 68 | 63 | 65 | 69 | 65 | 70 | 75 |
| After recording | % | 55 | 59 | 63 | 55 | 59 | 63 | 60 | 64 | 70 |
| Drying time at 130° C. | | | | | | | | | | |
| First ink receiving layer | second | 60 | 75 | 60 | 60 | 75 | 60 | 60 | 60 | 60 |
| Second ink receiving layer | second | 10 | 10 | 13 | 10 | 10 | 13 | 13 | 13 | 13 |
| Synthetic evaluation | | ○ | ○ | ○ | ○ | ○ | ○ | Δ | Δ | Δ |

TABLE 1-2

| | unit | Comparative Example 1 | Comparative Example 2 | Comparative Example 3 | Comparative Example 4 | Comparative Example 5 |
|---|---|---|---|---|---|---|
| Method for forming first ink receiving layer | | cast method | cast method | transfer method | — | Super Calender |
| Thickness of first ink receiving layer | μm | 15 | 20 (ununiform) | 27 | 0 | 0 |
| Thickness of bonding layer | μm | — | — | 3 | — | — |
| Thickness of second ink receiving layer | μm | 0 | 0 | 0 | 30 | 30 |
| Total thickness of ink receiving layers | μm | 15 | 20 | 30 | 30 | 30 |
| Proportions of ingredients in first ink receiving layer | | | | | | |
| Porous xerogel | wt % | 90 | 90 | 90 | — | — |
| Oxidized starch | wt % | — | — | — | — | — |
| Water-soluble cellulose | wt % | 0.5 | 0.5 | 0.5 | — | — |
| Polyvinyl alcohol | wt % | 9.5 | 9.5 | 9.5 | — | — |
| Ink absorbency | | X | — | ○ | ○ | ○ |
| Dot diameter | μm | 150 | — | 70 | 140 | 120 |
| Gloss | | | | | | |
| Before recording | % | 55 | — | 73 | 2 | 40 |
| After recording | % | 47 | — | 71 | 1 | 5 |
| Drying time at 130° C. | | | | | | |
| First ink receiving layer | second | — | — | 200 | — | — |

TABLE 1-2-continued

| | unit | Comparative Example 1 | Comparative Example 2 | Comparative Example 3 | Comparative Example 4 | Comparative Example 5 |
|---|---|---|---|---|---|---|
| Second ink receiving layer | second | — | — | — | 20 | 20 |
| Synthetic evaluation | | X | unworthy to evaluation | low productivity | X | X |

As can be seen from Table 1-1, each of the ink jet recording papers produced in Examples 1 to 9 according to the present method ensured high-grade quality in the recorded images and had high gloss after recording as well as before recording, in other words, only a slight decrease in gloss upon recording. Additionally, the results obtained in Examples 6 to 9 indicate that, in order to achieve satisfactorily high ink absorbency and no bleeding of ink, the proportion of the porous inorganic composition to the resin component in the first ink receiving layer was required to be higher than 60 weight % and it is desirable to choose properly the proportion of water-soluble cellulose in the resin component.

On the other hand, as can be seen from Table 1-2, the ink jet recording paper produced in Comparative Example 1 had poor ink absorbency although the gloss thereof was not very low after recording as well as before recording, and the images recorded thereon were deficient in high-grade feeling. In Comparative Example 2, the thick layer having a dry thickness of 20 μm was formed as the first ink receiving layer according to the cast coating method, but the uniformity and the surface smoothness of the layer formed was too bad to be worthy of recording quality evaluation. In the case of Comparative Example 3, the ink jet recording paper obtained had excellent recording quality and high gloss after recording as well as before recording. However, the coating mixture applied to the substrate 5 in a great thickness of 27 μm required much longer time for drying even at the high temperature of 130° C., and in order to form such a thick layer without attended by generation of cracks the coating was required to be dried at a lower temperature. Therefore, the production method adopted in Comparative Example 3 was undesirable from the viewpoints of operation efficiency and productivity. In the case of Comparative Example 4, the ink absorbency was satisfactory, but the ink receiving layer surface with a high gloss was not obtained. In the case of Comparative Example 5, although the ink receiving layer had a satisfactory ink absorbency and a moderately high surface gloss before recording, a great decrease in gloss was caused by recording to fail in achieving high-grade recording quality.

What is claimed is:

1. An ink jet recording material produced by preparing a material (i) for transfer use comprising a support coated with a first ink receiving layer comprising a porous inorganic composition and a resin component and a material (ii) which has a second ink receiving layer coated on at least one side of a substrate, bonding the first ink receiving layer of the material (i) to the second ink receiving layer of the material (ii) in tight contact by the use of an adhesive to form a united ink receiving layer, wherein the united ink receiving layer comprises at least two ink receiving layers, and then peeling the support of the material (i) off the united ink receiving layer;

wherein said porous inorganic composition is a porous xerogel, said second ink receiving layer is different in composition from the first ink receiving layer, said adhesive is a coating mixture used for the first or second ink receiving layer, said first ink receiving layer has a thickness of from 3 to 12 μm, and, said united ink receiving layer has a total thickness of at least 20 μm and a gloss of at least 60% when measured at the incident angle of 60° according to JIS Z8741.

2. An ink jet recording material as defined in claim 1, wherein the ratio between the porous inorganic composition and the resin component in the ink receiving layer of the material (i) is from 70/30 to 97/3 by weight.

3. An ink jet recording material as defined in claim 1, wherein said porous xerogel is a pigment prepared by converting an inorganic metal oxide in a sol state into a hydrogel and then drying the hydrogel in the form of a film and then grinding it into a powder.

4. An ink jet recording material as defined in claim 3, wherein said inorganic metal oxide is silica, alumina, zirconia or titania.

5. An ink jet recording material as defined in claim 1, wherein said resin component comprises a water-soluble resin or a water-dispersible resin.

6. An ink jet recording material as defined in claim 5, wherein said water-soluble resin or said water-dispersible resin comprises starch or polyvinyl alcohol.

7. An ink jet recording material as defined in claim 5, wherein said water soluble resin comprises water-soluble cellulose in a proportion of 1 to 50% by weight of total resins.

8. An ink jet recording material as defined in claim 1, wherein the support of the material (i) is a polyethylene film, a polypropylene film or a polyethylene terephthalate film.

9. An ink jet recording material as defined in claim 1, wherein the substrate of the material (ii) is a raw paper or a converted paper.

10. An ink jet recording material according to claim 1, wherein the second ink receiving layer comprises a water soluble resin.

11. An ink jet recording material comprising a first ink receiving layer comprising a porous inorganic composition and a resin component, and a second ink receiving layer coated on at least one side of a substrate, wherein said porous inorganic composition is a porous xerogel, wherein the first ink receiving layer is superposed on the second ink receiving layer on the side opposite the substrate, wherein said second ink receiving layer is different in composition from said first ink receiving layer, wherein said first ink receiving layer has a thickness of from 3 to 12 μm, wherein the first receiving layer and the second receiving layer are bonded in tight contact to form a united ink receiving layer comprising at least two layers, and wherein said united ink receiving layer has a total thickness of at least 20 μm and a gloss of at least 60% when measured at the incident angle of 60° according to JIS Z8741.

12. An ink jet recording material according to claim 11, wherein the ratio between the porous inorganic composition and the resin component in the first ink receiving layer is from 70/30 to 97/3 by weight.

13. An ink jet recording material as defined in claim 11, wherein said porous inorganic composition is a porous xerogel, wherein said porous xerogel is a pigment prepared by converting an inorganic metal oxide in a sol state into a hydrogel and then drying the hydrogel in the form of a film and then grinding it into a powder.

14. An ink jet recording material according to claim 11, wherein said resin component comprises a water-soluble resin or a water-dispersible resin.

15. An ink jet recording material according to claim 14, wherein said water-soluble resin or said water-dispersible resin comprises starch or polyvinyl alcohol.

16. An ink jet recording material according to claim 14, wherein said water-soluble resin comprises water-soluble cellulose in a proportion of 1 to 50% by weight of total resins.

17. An ink jet recording material according to claim 11, wherein the substrate is a raw paper or a converted paper.

18. An ink jet recording material according to claim 11, wherein the second ink receiving layer comprises a water soluble resin.

19. A method of preparing an ink jet recording material according to claim 11, comprising providing a material (i) which comprises a support coated with the first ink receiving layer, providing a material (ii) which comprises the substrate coated on at least one side with the second receiving layer, bonding the first ink receiving layer to the second ink receiving layer, then peeling the support of material (i) off the first receiving layer.

* * * * *